United States Patent [19]

Hornung et al.

[11] Patent Number: 5,411,349
[45] Date of Patent: May 2, 1995

[54] APPARATUS FOR COUPLING CYLINDRICAL STRUCTURAL COMPONENTS TO EACH OTHER

[75] Inventors: Ernst Hornung, Stuhr; Huba Oery, Aachen; Stefan Hornung, Aachen; Andreas Rittweger, Aachen, all of Germany

[73] Assignee: ERNO Raumfahrttechnik GmbH, Bremen, Germany

[21] Appl. No.: 85,756

[22] Filed: Jun. 30, 1993

[30] Foreign Application Priority Data

Jul. 1, 1992 [DE] Germany ............... 42 21 525.0

[51] Int. Cl.⁶ ................. F16L 23/04; F16L 23/06
[52] U.S. Cl. .................. 403/338; 285/407; 285/409; 292/256.65
[58] Field of Search ............. 403/335, 338; 285/407, 285/409, 410, 411; 292/256.6, 256.65, 256.69

[56] References Cited

U.S. PATENT DOCUMENTS

| | | | |
|---|---|---|---|
| 2,081,877 | 5/1937 | Shanor | 292/256.69 |
| 2,640,717 | 6/1953 | Scheuring | 285/411 |
| 2,896,978 | 7/1959 | Schumacher | 403/338 |
| 3,674,291 | 7/1972 | Goldberg | 403/338 |
| 4,969,923 | 11/1990 | Reeder et al. | 285/409 |

FOREIGN PATENT DOCUMENTS

| | | | |
|---|---|---|---|
| 43593 | 1/1982 | European Pat. Off. | 403/335 |
| 2655772 | 6/1978 | Germany . | |

*Primary Examiner*—Edward K. Look
*Assistant Examiner*—James A. Larson
*Attorney, Agent, or Firm*—W. G. Fasse; W. F. Fasse

[57] ABSTRACT

Cylindrical bodies of structural components, such as a spacecraft and a rocket section or two rocket sections, are coupled to each other by a releasable coupling device. The structural components have radially protruding flanges that face each other and are encircled by the coupling device. The coupling device includes a flexible tensioning element, such as a steel belt or link chain, the ends of which are interconnected by a clamping or locking device. The clamping or locking device is constructed as a two-armed lever, one end of which is connected to each of the ends of the tensioning element. The two-armed lever is rotatably supported and driven by an operating member such as a pipe section or rod. The two-armed lever is thus rotatable through an angle of about 180° so that the ends of the tensioning element are brought into overlapping positions. When the ends are in such overlapping positions the device is locked. Rotation of the two-armed lever into the opposite direction unlocks the device.

15 Claims, 6 Drawing Sheets

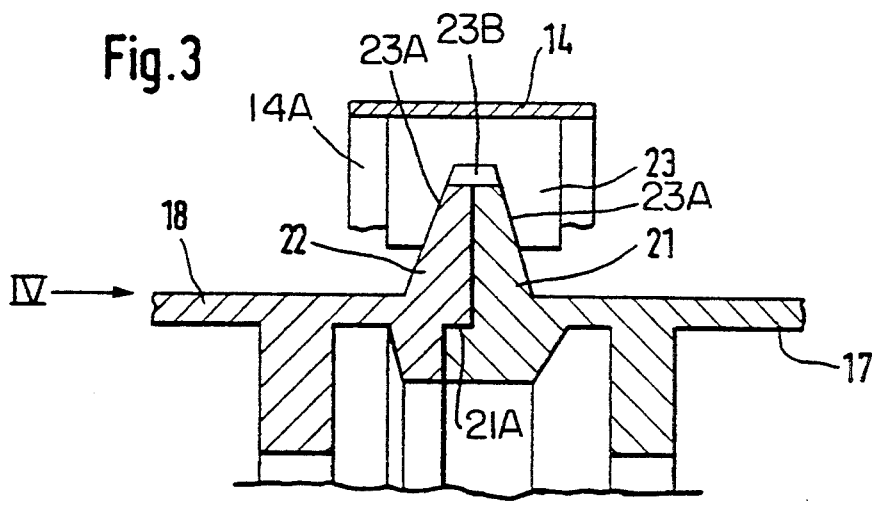
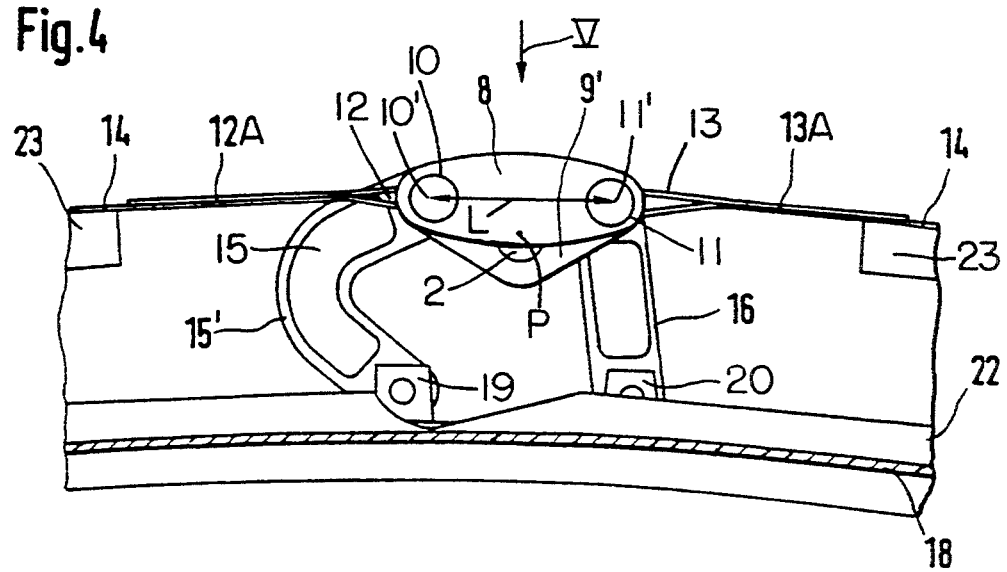
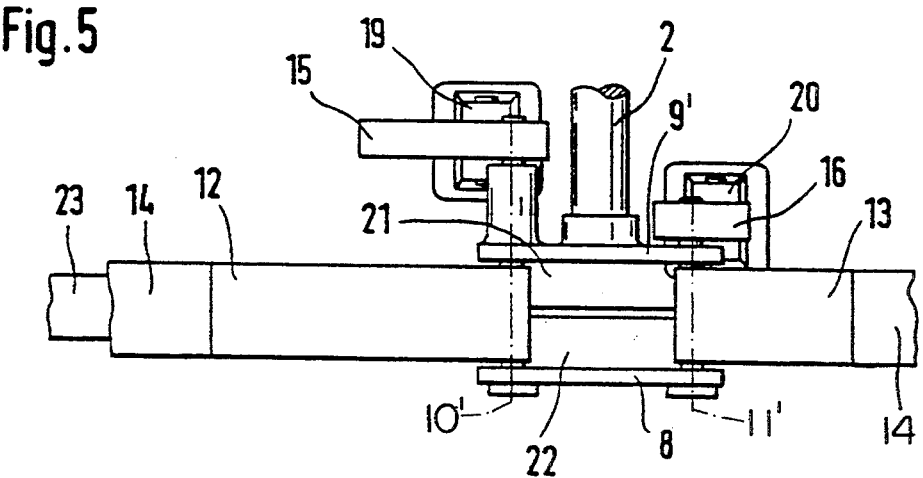

APPARATUS FOR COUPLING CYLINDRICAL STRUCTURAL COMPONENTS TO EACH OTHER

FIELD OF THE INVENTION

The invention relates to a coupling device for coupling cylindrical structural components such as rocket sections to each other in a releasable manner. Such a device is used, for example, for separating a burned-out rocket section from a spacecraft.

BACKGROUND INFORMATION

The structural components, such as cylindrical rocket sections, are conventionally provided with flange portions which interlock with each other and which are held together by a clamping device. Such clamping devices include at least one tensioning element with a tensioning belt, the ends of which are coupled to bolts extending perpendicularly to the direction of the pulling force applied for tensioning the respective belt by a locking member.

Devices of the foregoing type are used in different fields but are especially employed in aero-space technology, for example, to couple payloads to the final stage of a launcher rocket. These coupling devices must be so constructed that upon reaching the intended orbit, it must be possible to release the tension from the clamping belt for separating the rocket stage from another stage such as a payload. German Patent Publication (DE-OS) 2,655,772 (Heinze et al.), published on Jun. 15, 1978, describes a tensioning belt including movable clamping sliders. Such tensioning belts are also known in the art as Marman tensioning belts which are used to provide a form-and force-locking connection of two cylindrical structural components with each other, whereby the pretensioning force of a flexible steel belt is used to clamp connecting lips to each other. These conventional belts carry sliders having inwardly facing surfaces with a conical clamping configuration which engages the lips also having a conical configuration. These clamping lips form flange-type end sections of the structural components to be interconnected. Due to the pressure exerted by the steel belt the conical inner surface of the clamping slider is pressed against the conical lips to hold the components together.

The Marman-clamping belt has proven itself as a reliable, simple cost efficient connecting or coupling device in a multitude of satellite launchings. However, expanding the field of applications for the Marman-clamping belt in the aero-space technology has its limitation in the fact that the known embodiments of the Marman-clamping belt require the loosening of the clamping member which holds the two ends of the belt together, is accomplished by exploding the clamping member. As a result, conventional Marman belts cannot be used, for example, in all those instances in which a payload is to be coupled to and decoupled again and again from a transfer stage. Thus, conventionally, it is normally necessary to use a second mechanism in order to again secure the payload.

OBJECTS OF THE INVENTION

In view of the foregoing it is the aim of the invention to achieve the following objects singly or in combination:

to construct a coupling device of the type described in such a manner that a simple and reliable repeated opening and closing of the coupling device is possible;

the coupling device shall be suitable for coupling small structural components or large components such as rockets or rocket stages having a substantial diameter within the range of several meters; and to construct the clamp in such a manner that a rotational movement, preferably a motor driven rotational movement, can open and close the clamp of the coupling device repeatedly.

SUMMARY OF THE INVENTION

The coupling device according to the invention for coupling two structural components such as rocket stages to each other, is characterized by a steel belt or chain, the ends of which are coupled to each other by a clamping device constructed as a two-armed lever which is mounted on a rotatably positioned drive shaft and the ends of which are coupled through bolts (or the like) to the ends of the clamping belt or chain. Preferably, the drive shaft is centrally connected to the two-armed lever. The features of the present invention result in an improved operation of the clamping member. Further, the friction between the clamping elements especially the clamping belt or tensioning belt and the structural components to be coupled to each other, has been reduced using a chain instead of a belt according to the invention, whereby reliability is increased.

BRIEF DESCRIPTION OF THE DRAWINGS

In order that the invention may be clearly understood, it will now be described, by way of example, with reference to the accompanying drawings, wherein:

FIG. 3 is a sectional view through end portions of two structural components to be coupled with each other by a clamping device according to the invention;

FIG. 4 is a side view in the direction of the arrow IV in FIG. 3, showing the present clamping device in its open state;

FIG. 5 is a view in the direction of the arrow V in FIG. 4 also showing the present device in its open state;

11 in contact with structural components to be clamped together; and

Figure 13:
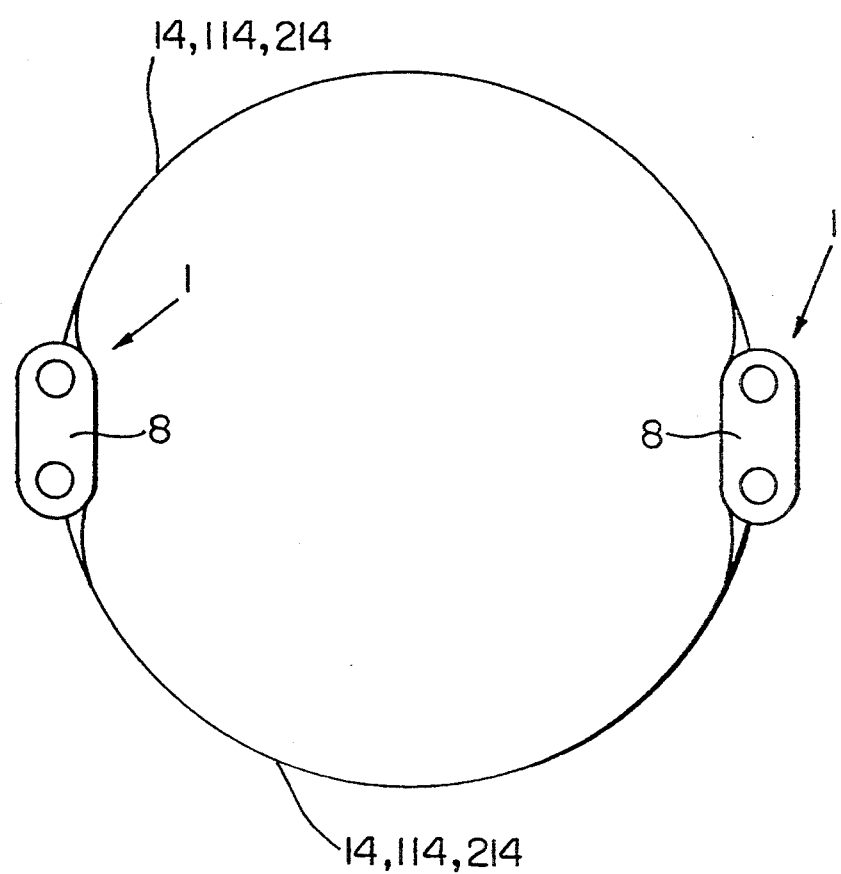

FIG. 13 shows schematically a tension belt with two two-armed levers.

DETAILED DESCRIPTION OF PREFERRED EXAMPLE EMBODIMENTS AND OF THE BEST MODE OF THE INVENTION

Figure 1:
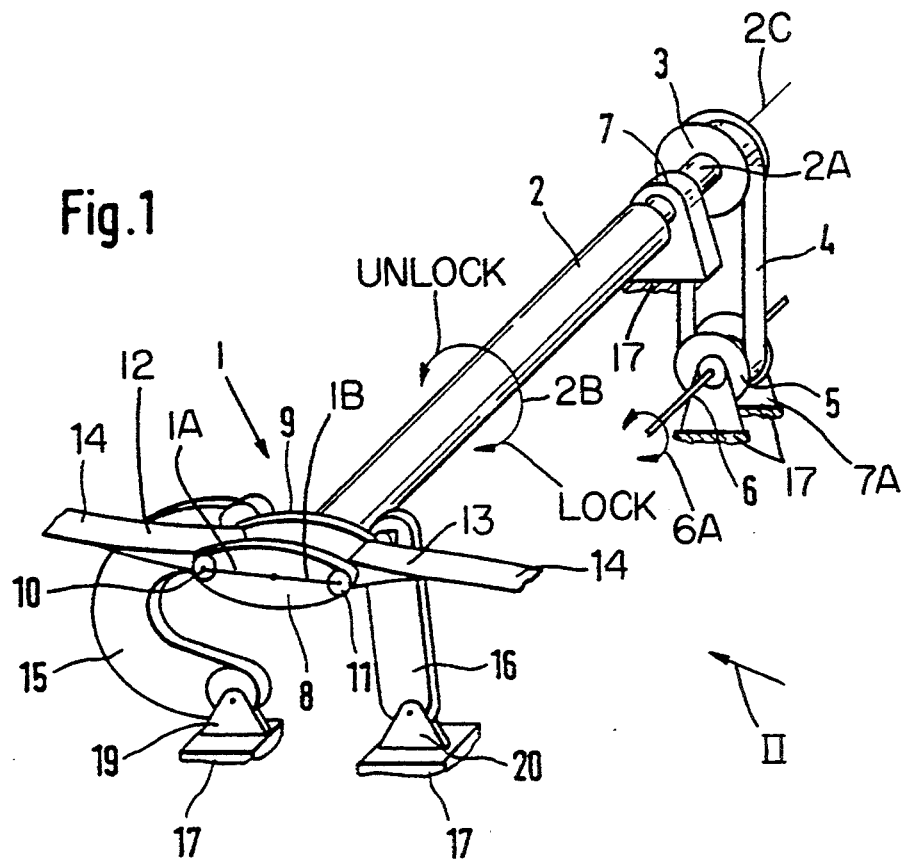
FIG. 1 is a perspective view of a coupling device according to the invention, showing particularly the clamping device in its open state and the drive mechanism for opening and closing the clamping device or member.

FIG. 1 shows a perspective view of the present coupling device comprising a tensioning or clamping lock 1 driven to be opened or closed by a torsion applying operating member 2 such as a rod or tube section referred to herein as a torsion operator 2. The torsion operator 2 is rotatably mounted in a bearing block 7 which mounts a tumbler ball bearing permitting the clockwise or counterclockwise rotation of the operator 2 but preventing its axial displacement. A drive end 2A of the operator 2 carries, for example, a gear pulley 3 driven by a gear belt 4 running around a gear drive pulley 5 mounted in bearing blocks 7A which in turn are coupled to the structural component 17 to which another structural component 18 is to be coupled by the present mechanism. The component 17 is, for example, a body of a spacecraft to be decoupled from a dispensible rocket body 18 shown in FIG. 3. A motor driven shaft 6 drives the pulley 5 as indicated by the arrow 6A. The just described drive mechanism rotates the operator 2 clockwise to lock the clamping device 1 or counterclockwise for unlocking the clamping device 1 as indicated by the arrow 2B.

The clamping device 1 is constructed as a rigid frame comprising two side plates 8 and 9 rigidly interconnected by cross-bolts 10 and 11 which space the side plates 8 and 9 sufficiently to hold end loops 12 and 13 of a tensioning belt 14 also shown in FIG. 3. The frame formed by the side plates 8 and 9 and the cross-bolts 10 and 11 is centrally connected to the operator 2 to form a two-armed lever with arms 1A and 1B.

Figure 2:
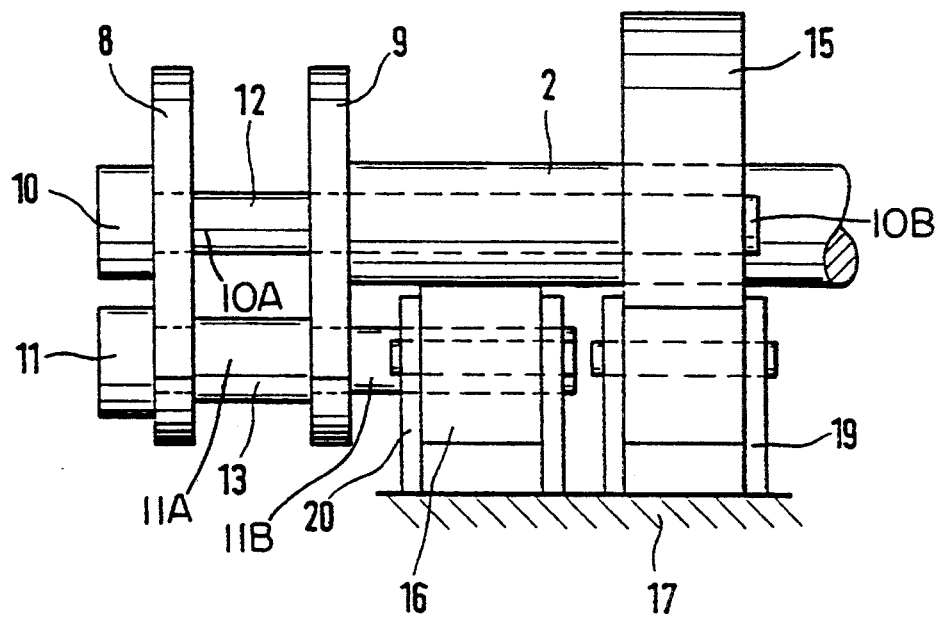
FIG. 2 is a side view approximately in the direction of the arrow II in FIG. 1, however showing the clamping device in its locked or closed state.

FIG. 2 shows how the belt loop 12 surrounds the inner portion 10A of the bolt 10 that protrudes out of the side plate 8. Similarly, the belt loop 13 surrounds the inner portion 11A of the bolt 11 that protrudes also from the side plate 8. The tensioning tape 14 and its loops 12 and 13 are made of a flexible flat metal such as a steel tape or the like. As further shown in FIG. 2, the right-hand end 10B of the bolt 10 is rotatably secured to a curved swivel arm 15, the lower end of which is bolted a swivel mount 19 coupled to the body 17 of the structural component to be linked with another structural component 18 by the tensioning belt 14. Similarly, the right-hand end 11B of the bolt 11 is rotatably mounted in a swivel arm 16, the lower end of which is bolted to a swivel mount 20 secured to the body 17. Preferably, both ends of the swivel arms 15 and 16 are supported by tumbler type ball bearings mounted in the swivel mounts 19 and 20 on the one hand, and in the upper ends of the swivel arms 15 and 16. The torsion operator 2 is rigidly coupled preferably to the center of the side plate 9 so that the locking device 1 can be operated as a two-armed lever about the rotational axis 2C of the operator 2 as shown in FIG. 1. The swivel arm 15 has the shown curved construction so that it may reach over the rotational axis 2C in the locked condition as best seen in the side view of FIG. 6. In this position the swivel arm 15 also reaches over the operator 2.

Figure 6:
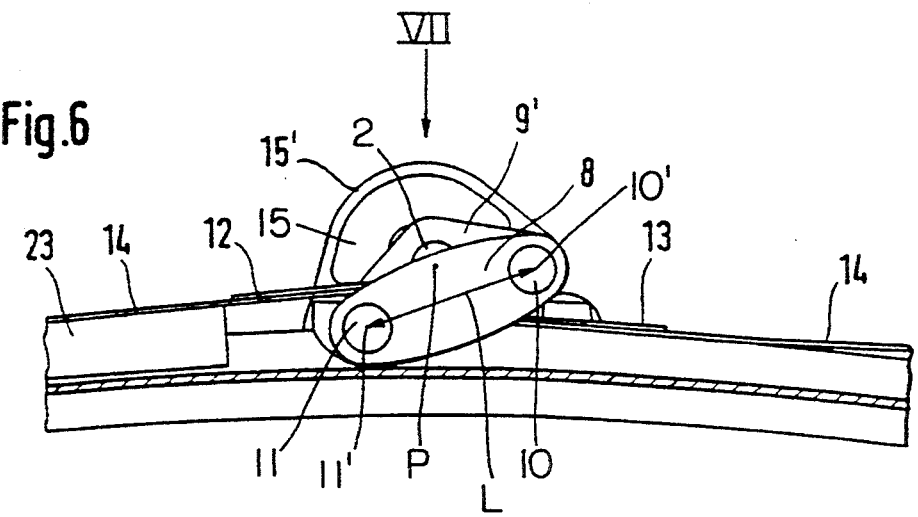
FIG. 6 is a side view similar as in FIG. 4, however now showing the clamping device in its closed state.

FIGS. 3 to 8 illustrate the operation of the present clamping or locking device. For most purposes, a plurality of such locking devices will be distributed circumferentially around the structural components. For example, four such locking devices 1 may be used and these locking devices are uniformly spaced at 90° angular spacings from one another around the structural components 17, 18 to be coupled to each other. FIG. 3 shows that the structural components 17 and 18 are provided with radially outwardly extending coupling flanges 21 and 22 forming interlocking shoulders 21A and provided with slanting outer surfaces 23A engaging into a groove 23B of clamping blocks 23 secured to the inwardly facing surface 14A of the tensioning belt 14. Preferably, the blocks 23 are positioned at spaced intervals along the steel belt between the belt ends that are connected to the two-armed lever. The grooves 23B have a conical cross-section to match the slanting walls 23A of the flanges 21, 22 for a proper clamping engagement. Referring to FIGS. 4, 5, 6, and 7, the side wall of the two-armed lever in this embodiment has been modified. The modified side wall 9' has a triangular configuration. Further, the point P where the longitudinal axis 2C of the torsion operator 2 passes through the triangular side plate 9' is located off-center relative to the center of a line L connecting the rotational axes 10' and 11' of the connecting bolts 10 and 11 respectively. When the clamping or locking device is open as shown in FIG. 4 the point P is located below the line L. When the locking device is closed or locked as shown in FIG. 6 the point P is located above the line L. FIGS. 4 and 6 also show that the swivel arm 15 may be provided with a handle as shown at 15'.

Figure 7:
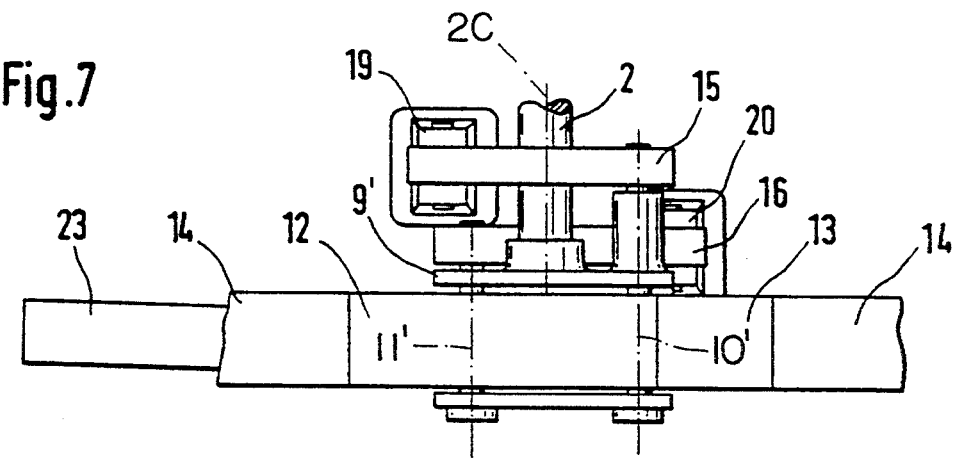
FIG. 7 is a view in the direction of the arrow VII in FIG. 6 showing the clamping device in its closed state.
Figure 8:
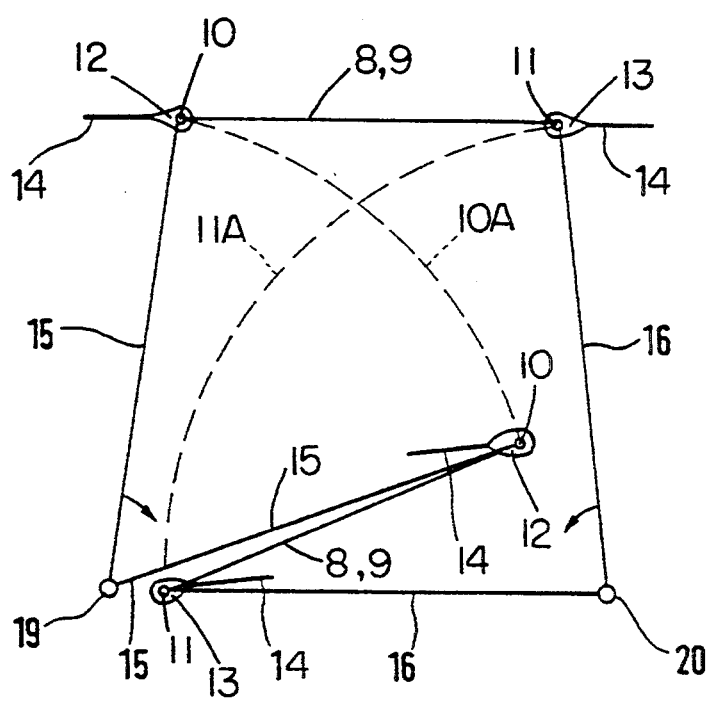
FIG. 8 is a schematic diagram showing the kinematic operation of the present clamping or locking member or device.

The clamping device according to the invention is operated by driving the gear belt 4 and thus the torsion operator 2 clockwise to tilt the double lever with its side plates 8 and 9, 9' from the open position of FIGS. 4 and 5 into the closed position of FIGS. 6 and 7. Referring specifically to FIG. 8, as a result of the clockwise movement the bolt 10 travels along a circular path 10A while the bolt 11 travels along said circular path 11A. The center of rotation for the path 10A is the central axis of the bearing in the swivel mount 19. The center of rotation for the path 11A is the center of the bearing in the swivel mount 20. As a result, the bolt 10 with the belt loop 12 moves closer to the two flanges 21 and 22 and so does the bolt 11 with the tape loop 13. At the end of the just described motion, the two tape ends overlap each other as shown in the lower portion of FIG. 8, whereby the diameter of the circle formed by the tensioning tape 14 is reduced to such an extent that a clamping force is applied to the flanges 21, 22 by the clamping blocks 23. This clamping force is uniformly distributed around the circumference of the flanges 21, 22. Due to the above described conical side walls 23A of the clamping sliders 23, cooperating with the corresponding conical surfaces of the flanges 21, 22, a formlocking cooperation between the coupling device and the flanges is achieved, whereby additionally, an axial clamping force component becomes effective due to said conical surfaces.

The closed position showing the clamping device in its locked condition as shown in FIGS. 6 and 7, illustrates that due to the closing movement the end portion of the torsion operator 2 connected to the side plate 9' also moves in the direction radially inwardly toward the flanges 21 and 22 so that in the closed position the torsion operator 2 is somewhat slanted with its longitudinal axis 2C relative to the starting position of the axis 2C. This slight slanting is permitted due to the use of a tumbler type ball bearing in the mounting block 7 for the operator 2.

As mentioned, the device is opened by rotating the operator 2 and thus the two-armed lever counterclockwise from the locked position shown in FIGS. 6 and 7, whereby the end position after the counterclockwise motion is completed, is the open position shown in FIGS. 4 and 5. The entire closing and opening motion can be repeatedly performed so that, for example, during a mission in outer space first a payload can be decoupled from a carrier system and at a later point of time either the same or another payload can be retrieved and coupled to the carrier for a return to earth.

Figure 9:
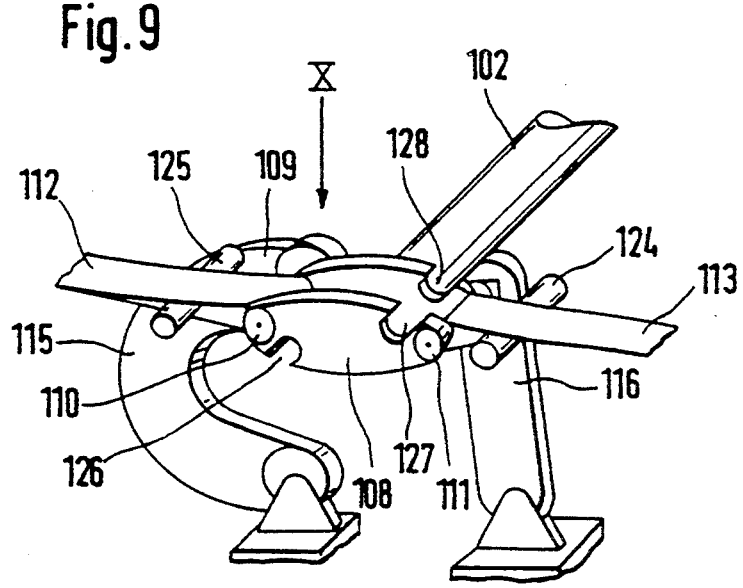
FIG. 9 is a perspective view of a second embodiment illustrating a modified clamping or locking member according to the invention in its open state.
Figure 10:
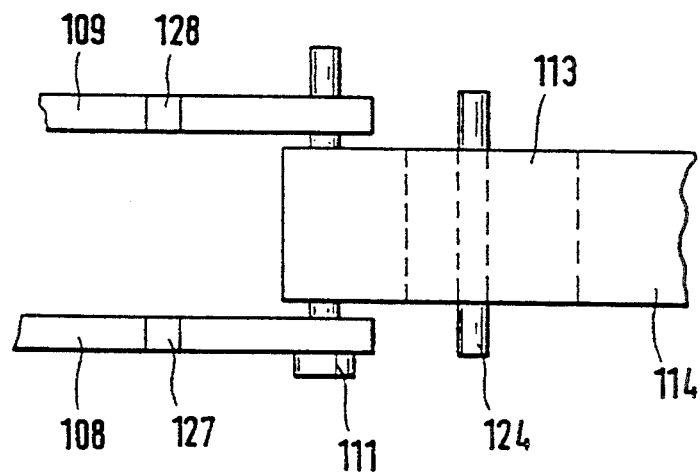
FIG. 10 is a top view in the direction of the arrow X in FIG. 9.

FIGS. 9 and 10 illustrate an embodiment in which an additional arresting possibility is provided for locking the two-armed lever in its closed position, whereby a safe function and the reliability of the coupling device are further increased. For this purpose, the end sections 112 and 113 of the flexible tensioning belt 114 are provided with holding or locking bolts 124, 125. These bolts extend sideways of the tensioning belt and project out of the tensioning belt to engage recesses 126, 127, 128 in the side plates 108 and 109 of the two-armed lever 101. All other structural features including the torsion operator 102 and two tumbling supports 105 and 106 correspond to the respective features in the embodiments of FIGS. 1 to 8.

The stiffness of the two-armed lever with its side plates 8 and 9,9' in FIGS. 1 to 8, or its side plates 108, 109 in FIGS. 9 and 10 can be further increased by arranging an additional cross brace which interconnects the two side plates in the same manner as the cross bolts 10 and 11 or 110 and 111. For example, the torsion operator 2 or 102 may pass entirely through one side plate and across the spacing between the two side plates for connection to the opposite side plate.

Figure 11:
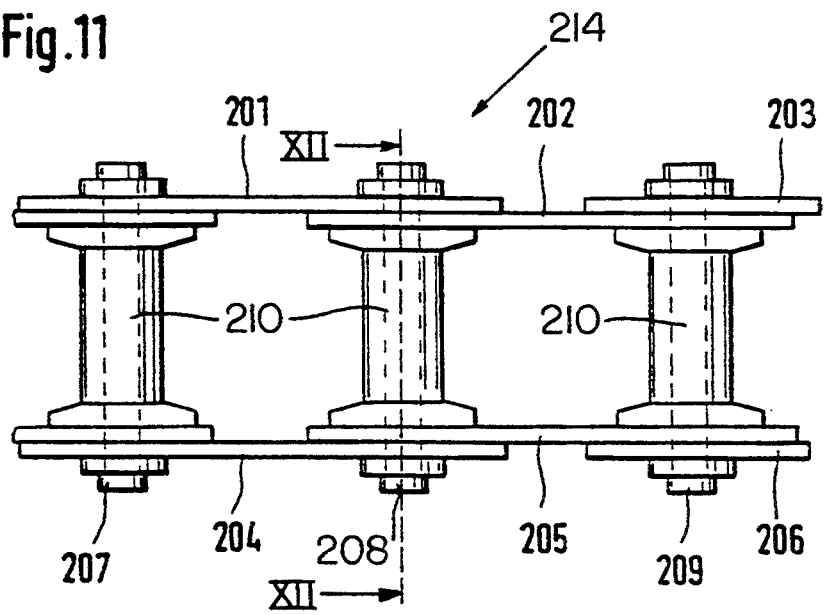
FIG. 11 is a top plan view of a link chain used according to the invention instead of a clamping or tensioning belt.
Figure 12:
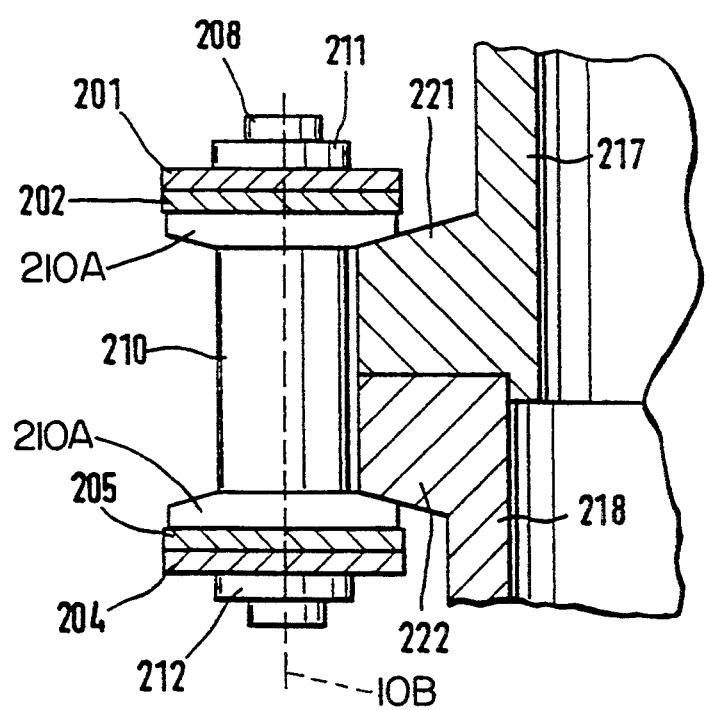
FIG. 12 is a sectional view along section line XII—XII in FIG. 11, showing the clamping chain of FIG.

FIGS. 11 and 12 illustrate a further example embodiment in which the flexible steel belt 14 of the above described embodiments is replaced by a link chain 214 comprising individual chain links 201, 202, 203, 204, 205, and 206 interconnected by chain pins 207, 208, and 209 so that the individual links can pivot or journal relative to the interconnecting chain pins 207, 208, 209. The chain links are spaced from one another by spacer sleeves 210, each carrying an end flange 210A with inwardly facing conical surfaces that engage corresponding conical surfaces of coupling flanges 221 and 222 of cylindrical structural components 217, 218 respectively to be coupled to each other. These spacer sleeves 210 are rotatable on the respective chain pin. The conical surfaces of the end flanges 210A of the spacer sleeve 210 have the same slanting angle relative to the longitudinal axis 10B of the spacer sleeve 210 as the conical surfaces of the coupling flanges 221, 222. As shown in FIG. 12, the chain links 201, 202, 204 and 205 are held in place on the chain pin 208 by conventional chain locks 211, 212. It should be mentioned that the embodiment of FIGS. 11 and 12 can also be provided with the interlocking elements shown at 126, 127, 128, and at 124, 125. In other words, the two-armed lever would be provided with the recesses 126 and so forth as shown in FIG. 9 and the bolts 124, 125 would be replaced by a chain pin projecting at one or both ends. For example, the chain pin could be made longer so that the projections outside the chain links could engage the above mentioned recesses when the double lever is in its locked condition.

In operation, the link chain 214 is tightened just as the steel belt is tightened by the rotation of the double-armed lever through its operator 2, 102 in the locking direction and the unlocking takes place in the opposite direction of rotation of the operator. When the chain is tensioned the coupling flanges 221, 222 of the structural components 217, 218 are clamped. FIG. 12 shows how the conical surfaces of the coupling flanges 221 and 22 cooperate in a form-locking manner with the conical surfaces of the flanges 210A for the coupling. The spacer sleeves 210 are capable of rolling along while the just mentioned conical surfaces engage each other to properly distribute the coupling forces uniformly around the coupling flanges or rims 221 and 222. This rolling engagement minimizes any friction between the components, whereby the wear and tear on the coupling mechanism is reduced and the useful life of the coupling system is correspondingly increased.

In the embodiment where the chain pins 207, 208, 209 or rather the last chain pin is elongated so as to engage the recesses in the side plates of the double-armed lever, such an elongation of the chain pin will be just sufficient for the just mentioned engagement in a recess in one or both side walls 108, 109.

FIG. 13 shows that at least two two-armed levers are preferably used in the flexible tensioning members 14, 114, or 214 where the circumference of the flanges e.g. 21, 22 to be interlocked, is substantial.

Although the invention has been described with reference to specific example embodiments it will be appreciated that it is intended to cover all modification and equivalents within the scope of the appended claims.

What we claim is:

1. A coupling apparatus for the releasable connection of cylindrical structural components to each other, said components having coupling flanges facing each other, said apparatus comprising flexible tensioning means for encircling said flanges and at least one clamping device for interconnecting ends of said flexible tensioning means, said clamping device comprising a two-armed lever having two ends, first means connecting a first end of said flexible tensioning means to one end of said two-armed lever, second means connecting a second end of said flexible tensioning means to the other end of said two-armed lever, a rotatable drive shaft connected to said two-armed lever, and a shaft drive connected to said rotatable drive shaft for rotating said two-armed lever in one direction for tightening said flexible tensioning means and locking said coupling apparatus, and for rotating said two-armed lever in an opposite direction for unlocking said coupling apparatus and removing tension from said flexible tensioning means.

2. The coupling apparatus of claim 1, wherein said first and second connecting means of said two-armed lever comprise connecting bolts at each end of said two-armed lever, and wherein said flexible tensioning means comprise a belt having loops at its ends, said loops looping around said connecting bolts.

3. The coupling apparatus of claim 1, wherein said drive shaft is connected centrally to said two-armed lever.

4. The coupling apparatus of claim 1, further comprising mounting means for operatively securing said two-armed lever and said rotatable drive shaft to one of said structural components, said mounting means comprising first tumbler bearing means for mounting said rotatable drive shaft at one end thereof and two swivel arms for mounting said two-armed lever in a tiltable manner to said one structural component, and second tumbler bearing means for mounting said swivel arms.

5. The coupling apparatus of claim 4, wherein one of said swivel arms has a curved shape.

6. The coupling apparatus of claim 4, wherein said mounting means comprise mounting shafts of a different length for each of said swivel arms so that said mounting shafts extend to a different spacing laterally of said two-armed lever.

7. The coupling apparatus of claim 1, wherein said flexible tensioning means comprise a supplementary load carrying bolt (124, 125) coupled to each end of said flexible tensioning means, said two-armed lever comprising a recess therein for engaging said load carrying bolt in the locked condition of said two-armed lever.

8. The coupling apparatus of claim 1, wherein said flexible tensioning means comprise a flexible flat steel belt and clamping blocks secured to an inner surface of said steel belt at spaced intervals along said steel belt between the ends of said steel belt connected to said two-armed lever.

9. The coupling apparatus of claim 1, wherein said flexible tensioning means comprise a link chain comprising chain links having chain link plates, chain pins interconnecting said chain links, and cylindrical bushings rotatably mounted on said chain pins between neighboring chain link plates, said cylindrical bushings having end flanges with conically inwardly facing surfaces for engaging said flanges of said structural components.

10. The coupling apparatus of claim 1, comprising at least two two-armed levers spaced along said flexible tensioning means.

11. The coupling apparatus of claim 1, wherein a gear pulley is rigidly mounted on said drive shaft, a further driven gear pulley mounted on a driving shaft, and a gear belt running around said gear pulleys for driving said drive shaft.

12. The coupling apparatus of claim 1, wherein said two-armed lever comprises two side plates interconnected by said first and second connecting means comprising cross-bolts holding ends of said flexible tensioning means between said two side plates.

13. The coupling apparatus of claim 12, wherein said flexible tensioning means comprise a flexible steel belt having belt end loops reaching between said side plates, said cross-bolts extending through said belt end loops.

14. The coupling apparatus of claim 12, wherein said flexible tensioning means comprise a flexible link chain having chain links including end links extending between said two side plates of said two-armed lever, said cross-bolts forming chain pins passing through said end links and connected to said side plates.

15. The coupling apparatus of claim 14, wherein said flexible link chain comprises at least one elongated chain pin projecting with a pin end at least on one side laterally from a respective chain link to form a supplementary load carrying bolt, and wherein at least one of said side plates has at least one recess for engaging said supplementary load carrying bolt in the locked condition of said two-armed lever.

* * * * *